United States Patent [19]

Peloquin et al.

[11] 4,374,024

[45] Feb. 15, 1983

[54] UNDERWATER SUCTION DEVICE FOR IRRADIATED MATERIALS

[75] Inventors: Arthur V. Peloquin, Danville; Frank D. Qurnell, San Jose, both of Calif.

[73] Assignee: General Electric Company, San Jose, Calif.

[21] Appl. No.: 234,957

[22] Filed: Feb. 17, 1981

[51] Int. Cl.³ .......................................... B01D 29/20
[52] U.S. Cl. ..................................... 210/241; 15/1.7; 210/172; 210/416.1; 252/626; 252/631; 252/633
[58] Field of Search .................. 15/1.7; 210/167, 169, 210/172, 237, 238, 241.1, 249, 250, 258, 416.1, 416.2, 459, 460, 541, 542, 170; 252/631, 626, 633

[56] References Cited

U.S. PATENT DOCUMENTS

| | | | |
|---|---|---|---|
| 2,725,356 | 11/1955 | Lombardi | 210/241 |
| 3,039,122 | 6/1962 | Birdsall | 210/169 |
| 3,063,077 | 11/1962 | Pansini | 15/1.7 |
| 3,890,233 | 6/1975 | Gischel | 210/241 |
| 3,936,899 | 2/1976 | Henkin et al. | 15/1.7 |
| 3,961,393 | 6/1976 | Pansini | 15/1.7 |

Primary Examiner—Peter A. Hruskoci
Attorney, Agent, or Firm—Ivor J. James, Jr.; Samuel E. Turner; Raymond G. Simkins

[57] ABSTRACT

An underwater suction device for collecting irradiated materials in a pool of water. The device includes injection and suction tubes and a removable, disposable filter for capturing irradiated materials. Pressurized water is injected into the suction tube through a jet pump nozzle to establish a suction flow through the tube. The suction device is manually positionable by an operator standing at a dry location and extending the device underwater by maneuvering a positioning pole. The pole is pivotally connected to the injection or suction tube by a variably positioning latching mechanism.

2 Claims, 4 Drawing Figures

UNDERWATER SUCTION DEVICE FOR IRRADIATED MATERIALS

BACKGROUND

Nuclear reactors for experimentation, power production, and other purposes have been in operation within the United States and other countries for many years. However, research and development in the art of nuclear reactor technology and related fields has continued at a rapid pace.

A frequent location for the acquisition of technical data and for sampling components of the reactor system for technical studies is the reactor service pool, which is adjacent to the pressure vessel (in power reactors). U.S. Patent Application Ser. No. 220,826, filed Dec. 29, 1980, describes a sample cutting device for irradiated components, which is operative in the reactor service pools. This document is expressly referred to, incorporated herein, and made a part of the instant application.

As noted in the above-referenced document, underwater machining operations are conducted on a previously irradiated reactor component above a "chip tray" or working platform in the reactor service pool. The tray collects chips, particles, cuttings, fragments, and other irradiated materials produced by underwater machining. The accumulation of these materials fouls the demineralized water of the reactor service pool, which shields the operating technicians and engineers from unreasonable radiation exposure.

It is accordingly an object of the invention to collect and capture irradiated materials such as chips, particles, cuttings, fragments, and other substances from an underwater environment shielding the operating technician and others from unreasonable radiation exposure.

It is another object of the present invention to provide a water-propelled jet pump device for the subaqueous collection of irradiated materials.

It is another object of the present invention to create an underwater suction device with a disposable filter for collecting irradiated materials, which is subaqueously removable to shield operating personnel from the collected materials.

It is another object of the instant invention to create a light-weight, portable suction device for collecting subaqueous irradiated materials from a working tray for underwater machining operations.

It is another object of the invention to provide a manually positionable suction device for collecting subaqueous irradiated materials, which is variable in the aspect at which the suction end of the device collects the materials.

SUMMARY OF THE INVENTION

These and other objects of the invention are achieved by an underwater suction device for collecting irradiated materials, in which pressurized water is jet pumped from an injection tube into a suction tube connected to a collecting filter. The filter is subaqueously removable from the suction tube by vertically turning the filter and applying a tool to release the filter. The filter is disposable in an underwater container positioned on the working platform by carrying the removed filter to the container and dropping it therein. The device is maneuvered by a positioning pole pivotably mounted on the injection or suction tube. A latching mechanism mounted on the pole is remotely controlled by an operator handling a lanyard to discretely set the aspect of the suction tube and filter in a chosen orientation. The device is projected for use in the reactor service pool adjacent the pressure vessel of a nuclear reactor. Irradiated materials are collected by the device from a working platform above which underwater machining operations are conducted upon reactor components from time to time.

DRAWING OF THE PREFERRED EMBODIMENT

In order to illustrate the device effectively carrying out the objects set forth above, the following drawing is provided, in which.

Figure 4:
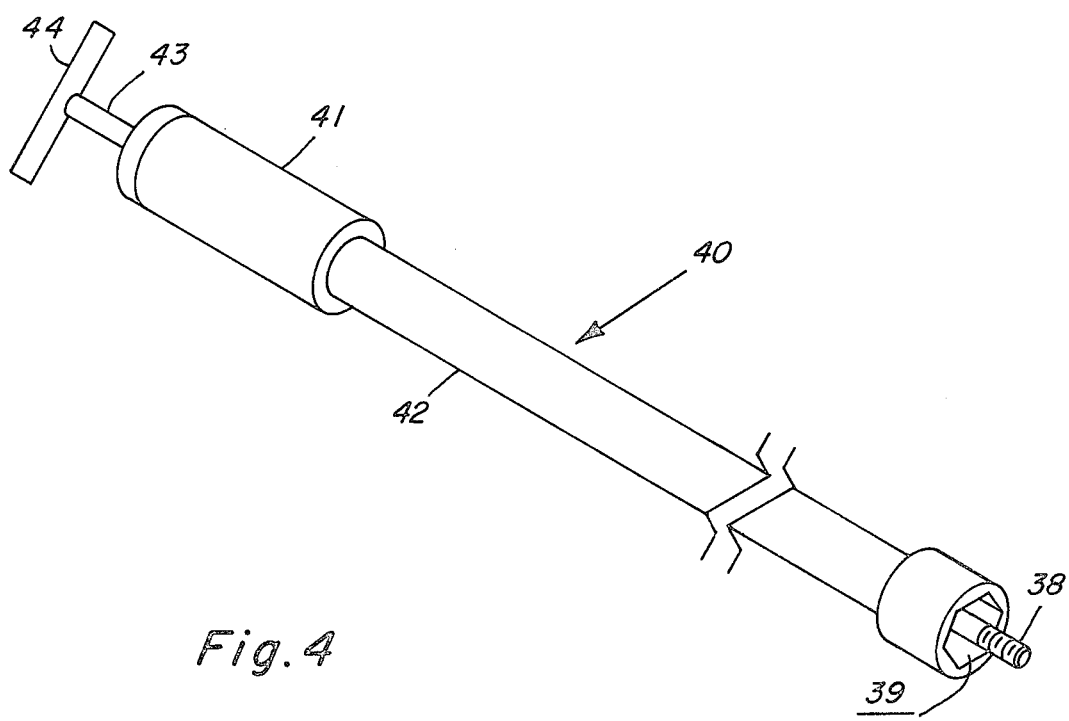
Figure 3:
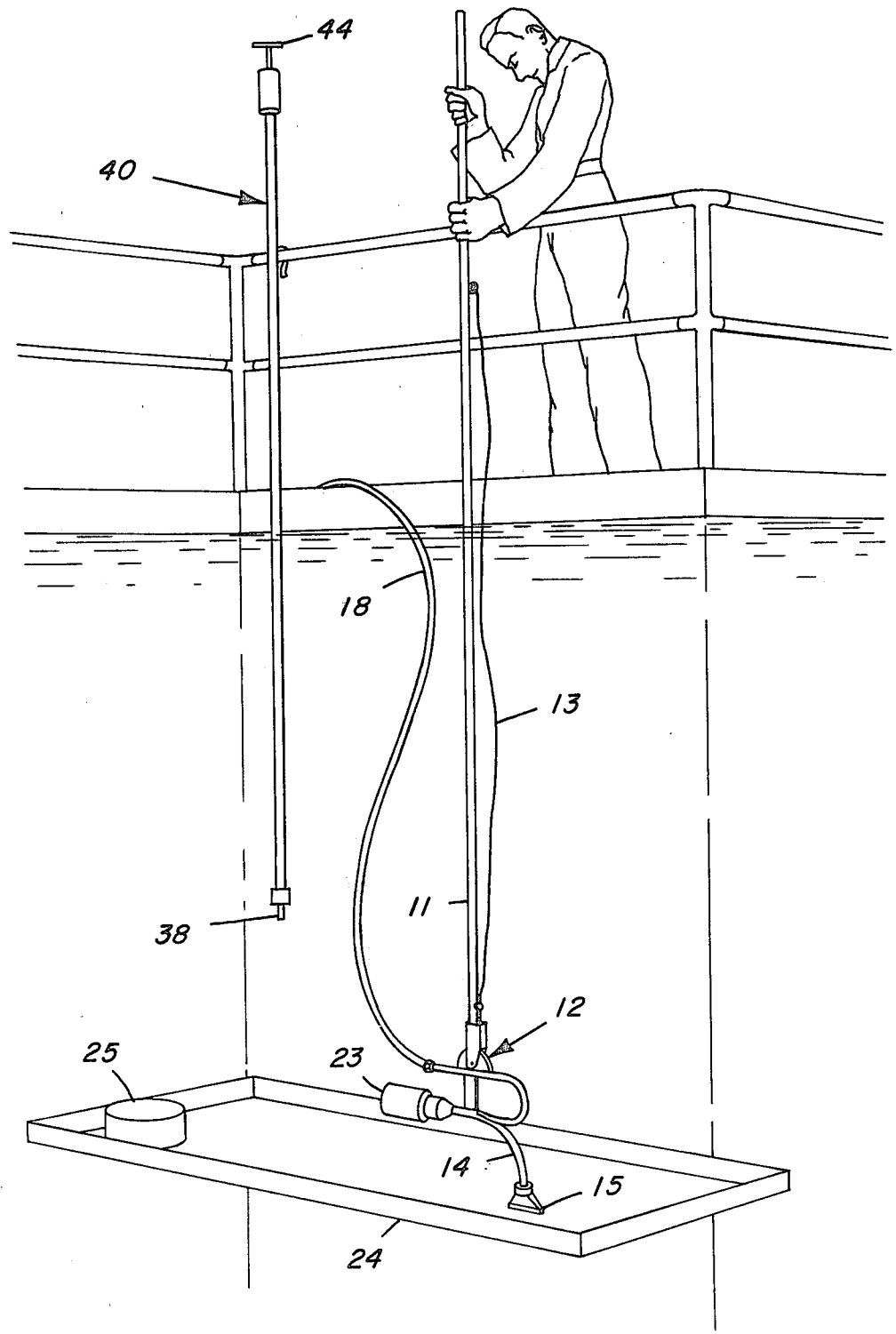

FIG. 3 schematically illustrates a possible environment for operating the invention, namely the reactor service pool of a nuclear reactor; and FIG. 4 schematically illustrates the tool permitting the remote subaqueous removal and disposal of the filter element.

DESCRIPTION OF THE PREFERRED EMBODIMENT

Figure 1:
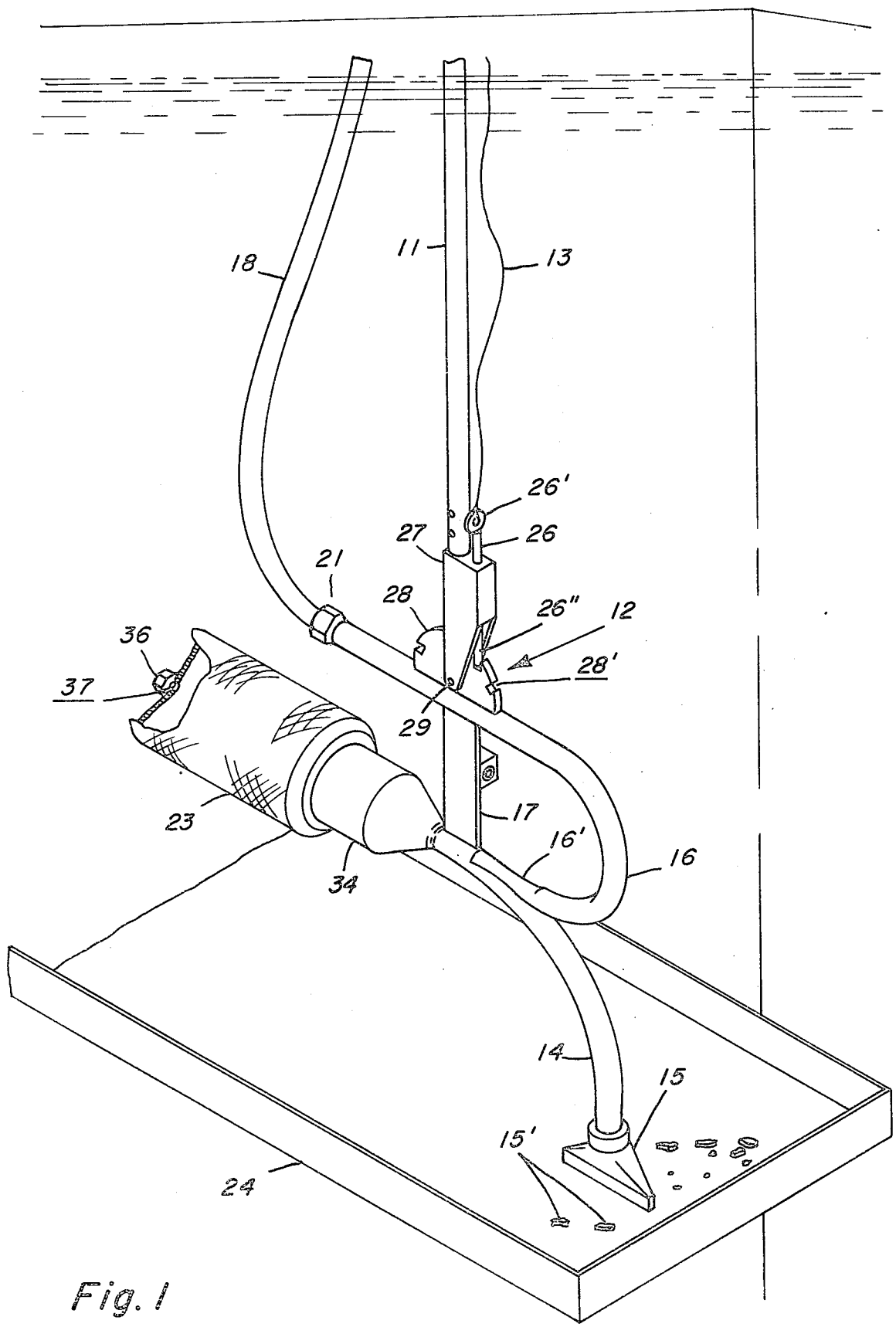
FIG. 1 is an elevational diagram of the underwater suction device for irradiated materials.

The device of FIG. 1 discloses important features of the underwater suction device including a positioning or maneuvering pole 11, a pivoting, variably positionable latching mechanism 12 including a lanyard 13 for releasing the latching mechanism 12, and a suction tube 14 including a funnel 15 for receiving irradiated materials 15'. More specifically, the latching mechanism 12 is mounted on a curved injection tube 16 including a supporting strut 17. The injection tube 16 receives pressurized water from an external source such as for example a hose 18 suitably connected to the injection tube 16 by a connector 21. The injection of pressurized water from the injection tube 16 is through a nozzle 16' of diminishing internal diameter, the longitudinal axis of the nozzle 16' preferably being in line with the longitudinal axis of the straight portion of suction tube 14. This injection creates water flow through suction tube 14 and a consequent suction force which draws irradiated waste materials 15' into the funnel 15 and through suction tube 14 to a removable, disposable filter 23 such as for example the Velcon model 1-6286-TB type filter shown in FIG. 1.

Figure 2:
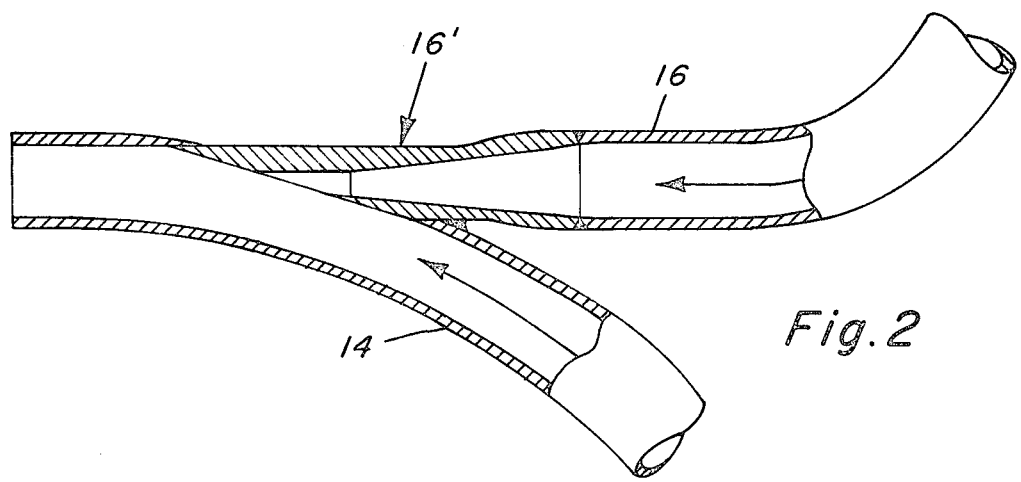
FIG. 2 is a schematic illustration of the internal flow dynamics at the nozzle through which the driving water of the device flows to establish suction flow for collecting underwater irradiated material.

FIG. 2 illustrates the supply of pressurized water from an external source, which may for example be about 80 to 100 psi, although it need not specifically be within that pressure range. The pressurized water travels through the nozzle 16' of diminishing internal diameter. According to known jet pump principles, the momentum of the driving water through nozzle 16' causes water flow through suction tube 14 which creates suction effect at the lower end of the suction tube 14 including the funnel 15 actually receiving the radioactive materials 15'.

FIG. 3 illustrates the operation of the device in the reactor service pool for collecting irradiated materials from a working platform 24 mounted at the side of the pool. Additionally shown is a disposal container 25 for interim underwater storage of the filter 23 after it is saturated with collected materials and removed from the device as will be set forth below.

The latching mechanism 12 pivotably connects the maneuvering pole 11 to the suction device and it includes a downwardly biased plunger 26 (FIG. 1) including a ring 26' at the upper end for tying or otherwise securing the lanyard 13 thereto. A connecting piece 27 is suitably joined to the end of the pole 11. Both the connecting piece 27 and pole 11 are preferably made of aluminum to reduce weight and faciliate handling. The connecting piece 27 is pivotally connected to a plate 28 by suitable means such as a pin 29. The plate may be semicircular in form and includes a straight and a curved portion. The straight portion is suitably fixedly mounted on the injection tube 16 or suction 14 tube. A plurality of spaced detents 28' are formed in the curved portion of the plate 28.

The plunger 26 locks the aspect of the pole 11 to the injection tube 16 by slipping into one of selected detents 28' of the plate 28. To release the device to freely pivot about pin 29, the operator simply withdraws lanyard 13 to disengage the plunger tip 26". By tugging at the hose 18 or by holding the funnel 15 of the suction tube 14 against the tray or platform 24, a particular detent 28' can be selected to establish the aspect of the suction tube 14 or filter 23 desired.

Strut 17 rigidly braces the injection tube 16 against the suction tube 14. The maneuvering pole 11 is mounted to the injection tube 16 immediately above strut 17 in the embodiment shown. Alternatively, the pole 11 can be connected directly to the suction tube 14. In lieu of curved suction and injection tubes 14, 16, straight tubes or other configurations of tubes can be substituted.

The filter 23 suggests for use in the suction device of this invention is cylindrical, as shown in FIG. 1. The filter 23 captures irradiated materials by collecting them on an outer cloth sock. The filter 23 is preferably screw mounted onto an end of the suction tube 14 including a suitable connecting piece 34, which is suitably joined (as for example by welding) to the upper end of the suction tube 14. The filter 23 includes a multisided (e.g., hexagonal) boss 36, including a centrally disposed, threaded hole 37 to cooperatively engage a threaded screw 38 and socket 39 arrangement at the end of a filter removal tool 40 shown in FIG. 3.

The removal tool 40, also shown in FIG. 4, includes an outer tube 42 or cylinder including a handle 41, the socket 39, and an inner rod 43 including the threaded screw 38. The tube 42 and rod 43 are coaxially arranged, and the rod 43 is suitably perpendicularly joined by welding to a cross bar 44, serving as a handle for threading the screw 38 into hole 37, when removing filter 23 from the device.

To subaqueously remove a spent filter 23 from service, the latching mechanism 12 is uncoupled and the filter 23 is vertically oriented. The lower end of the tool 40 suitably engages the filter 23 at hole 37 and boss 36, which permits the filter 23 to be screwed off the connecting piece 34 without falling onto platform 24. By rotating crossbar 44, the operator can disengage the filter 23 from the tool 40 and drop it onto disposal container 25.

The driving water through hose 18 is preferably demineralized and pressurized between 80 to 100 psi, although it is only important that the driving water be significantly over-pressured relative to the underwater pressure at the desired suction location near funnel 15.

A suitably constructed jet nozzle 16' such as that shown in FIG. 2 enhances the driving force of the injected water. As noted above, its construction involves a diminishing internal diameter as the injection tube 16 approaches the point of joinder with the suction tube 14.

To facilitate ease of handling and reduce weight, the device is generally constructed of aluminum. The tubing material preferably utilized is 606IT6 auminium.

The foregoing description is susceptible of reasonable modifications that may occur to those skilled in the art. However, this invention is not meant to be limited to the embodiment just shown and described. The claims set forth the inventive concept and are intended to cover all modifications coming within the spirit and scope of the invention described herein.

What is claimed is:

1. A remotely operated suction device for underwater collection of irradiated materials, comprising:
   a source of pressurized water;
   suction tube means for receiving irradiated materials;
   filter means for capturing at least some of said irradiated materials, mounted on said suction tube means;
   injection tube means for injecting water from said source of pressurized water into said suction tube means;
   means for maneuvering said injection tube means in a pool of water;
   means for pivotally coupling said means for maneuvering with said injection tube means, including means for latching said means for pivotally coupling in any one of a plurality of discrete positions within the range of motion of said means for pivotally coupling, said means for pivotally coupling including a curved portion defining a plurality of spaced detents and said means for latching including a plunger biased toward said curved portion, said plunger including a tip for cooperatively engaging a selected one of said plurality of spaced detents; and
   means for remotely releasing said means for latching, whereby said injection tube means may be repositioned on said means for maneuvering and irradiated materials are remotely collected underwater.

2. A remotely operated suction device for underwater collection of irradiated materials comprising a suction tube including a funnel effective for receiving irradiated materials, a disposable filter effective for capturing said irradiated materials, said suction tube transferring said irradiated materials into said disposable filter, an injection tube including a nozzle of diminishing internal diameter effective for injecting pressurized water into said suction tube toward said filter, a releasable latch including a tip, a semi-circular plate mounted on said injection tube and including a curved and straight portion, said curved portion defining a plurality of spaced detents, said tip effective for cooperatively engaging a selected one of said plurality of spaced detents, maneuvering means pivotally mounted on said semi-circular plate for maneuvering said suction device, and remote means for remotely operating said latch for release, said remote means engaged with said maneuvering means, whereby irradiated materials are subaqueously gathered for disposal.

* * * * *